United States Patent [19]

McGilvery et al.

[11] Patent Number: 4,980,142

[45] Date of Patent: Dec. 25, 1990

[54] PREPARATION OF PHOSPHOROUS ACID

[75] Inventors: James D. McGilvery, Etobicoke; Helena Twardowska, Mississauga; Slawomir M. Cybulski, Vanier, all of Canada

[73] Assignee: Tenneco Canada Inc., Islington, Canada

[21] Appl. No.: 503,478

[22] Filed: Mar. 30, 1990

[30] Foreign Application Priority Data

Feb. 1, 1990 [GB] United Kingdom ................. 9002277

[51] Int. Cl.$^5$ ....................... C01B 25/16; C01B 25/12
[52] U.S. Cl. .................................... 423/316; 423/304; 423/317
[58] Field of Search ........................ 423/304, 317, 316

[56] References Cited

U.S. PATENT DOCUMENTS 2,613,135  10/1952  Shultz .................................. 423/304
3,532,461  10/1970  Roberts et al. ....................... 23/165

FOREIGN PATENT DOCUMENTS 849435    8/1970  Canada .
3319606  12/1984  Fed. Rep. of Germany .
879734   10/1961  United Kingdom ................ 423/304

*Primary Examiner*—Gregory A. Heller
*Attorney, Agent, or Firm*—Sim & McBurney

[57] ABSTRACT

Phosphorous acid is formed by gaseous phase oxidation of phosphorus with water vapour to form predominantly $P_2O_3$ and dissolving the $P_2O_3$ so-formed in water. The $P_2O_3$ also can be recovered as the product by quenching the $P_2O_3$ to a stable temperature using an inert cooling medium rather than water. Oxygen also may be used in conjunction with the water vapour. Sufficiently rapid quenching of reaction products may result in the formation of red amorphous phosphorus from unreacted phosphorus.

20 Claims, 3 Drawing Sheets

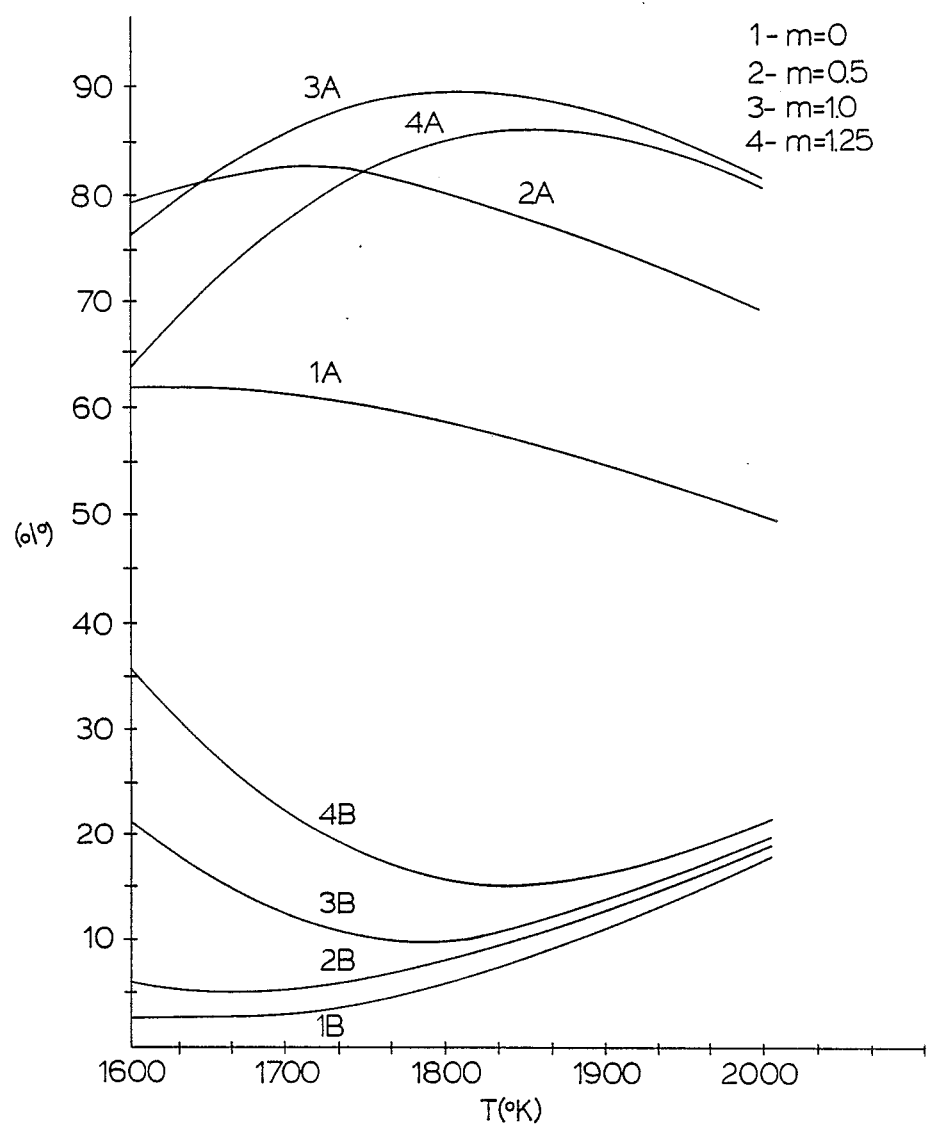

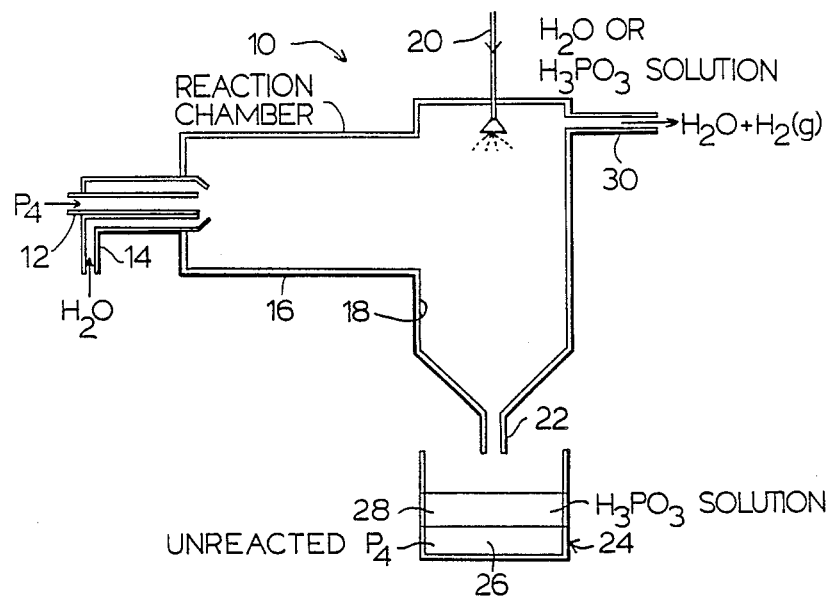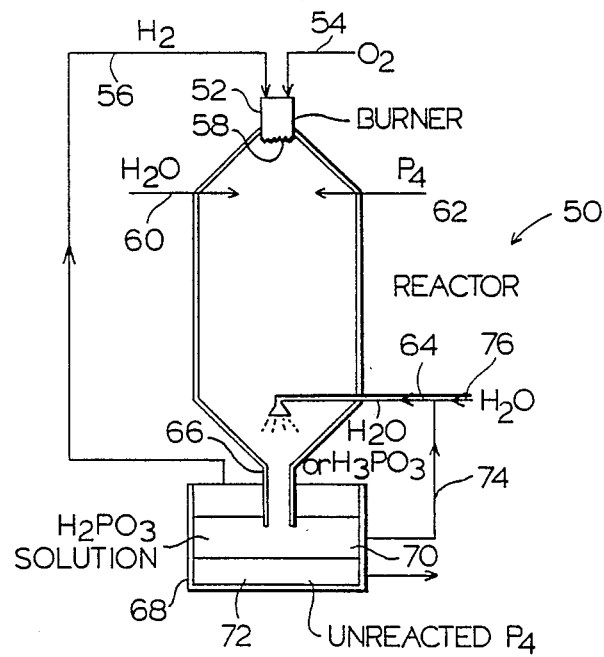

PREPARATION OF PHOSPHOROUS ACID

FIELD OF INVENTION

The present invention is directed to the preparation of phosphorous acid and phosphorus trioxide the direct oxidation of elemental phosphorus.

BACKGROUND TO THE INVENTION

High purity phosphorous acid is useful in the production of phosphorates, in salt or ester form, for use in a variety of water treatments, from desealing to corrosion inhibition.

The preparation of phosphorous acid ($H_3PO_3$) by the direct oxidation of elemental phosphorus and dissolution of the resulting oxides in water has been difficult to accomplish selectively because of the variety of oxides of phosphorus that can be formed.

A thermodynamic analysis of the oxidation products resulting from reacting phosphorus with an oxidant indicates that, under no circumstances, would $P_4O_6$ be a stable phase. Any $P_4O_6$ formed should quantitatively disproportionate into $P_4$ and $P_4O_{10}$ at higher temperatures. However, if one assumes that $P_2O_3$ can be formed, this compound is a stable phase over an approximate temperature range from 1500° to 2100° K., with the fraction of phosphorus initially present reporting as $P_2O_3$ depending on the nature of the oxidant. The $P_2O_3$ so formed can be dissolved in water to form the phosphorous acid or allowed to dimerize to $P_4O_6$ and recovered as such.

Oxidants which may be considered for this reaction are oxygen, carbon dioxide and water. The heat release using pure oxygen in stoichiometric amounts is so great that the reaction temperature will exceed the desired range and some form of cooling is required. In addition, precise metering of the reactants must be effected since a deficiency of $O_2$ will result in lower oxides of phosphorus while an excess of $O_2$ will generate higher oxides, notably $P_4O_{10}$. This process has been described in U.S. Pat. No. 3,532,461 and German O.S. No. 3,319,606. Carbon dioxide as an oxidant results in a relatively limited temperature range in which $P_2O_3$ is stable and other oxides are present. This process is described in U.S. Pat. No. 3,532,461.

SUMMARY OF INVENTION

It has now surprisingly been found that $H_2O$ is a superior oxidant for the formation of $P_2O_3$ from phosphorus. The temperature of stability of $P_2O_3$ formed by the reaction is large and ranges from about 1000° to about 2500° K. and significant quantities of other oxides of phosphorus are not formed. The $P_2O_3$ may be recovered in the form of phosphorous acid or the oxide form by rapid quenching of the products of the oxidation.

The phosphorous oxide species present at ambient temperature is $P_4O_6$, i.e. the dimer of $P_2O_3$. Where reference is made herein to the recovery of $P_2O_3$ as such, it will be understood that the reference is to recovery of the dimer.

Accordingly, the present invention provides a process for the production of a phosphorous product, which comprises oxidizing phosphorus at an elevated temperature in the range of about 1000° to about 2500° K. in the gaseous phase with water vapor predominantly to $P_2O_3$, and rapidly cooling the $P_2O_3$ with a quench medium. The quench medium may be water, in which case phosphorous acid is formed, or may be an inert gas, in which case the oxide is recovered.

In one aspect, therefore, the present invention provides a process of forming phosphorous acid ($H_3PO_3$) by oxidizing phosphorus in the gaseous phase with water vapour predominantly to $P_2O_3$ and dissolving the $P_2O_3$ so-formed in water. To achieve the high temperature of reaction to form $P_2O_3$, a plasma torch or the like may be employed and the gaseous products of reaction generally rapidly are quenched to avoid decomposition of phosphorous acid.

In another aspect of the present invention, the $P_2O_3$ formed by reaction of phosphorus with water vapour is recovered by rapidly cooling the $P_2O_3$ to a temperature at which it may be recovered as a stable phase, generally below about 350° K.

BRIEF DESCRIPTION OF DRAWINGS

FIG. 2 is a graphical representation of the equilibrium % of phosphorus conversion to $P_2O_3$ and other oxides for varying values of $P_2$:$H_2O$:$O_2$ = 1:3.5:m;

FIG. 3 is a schematic representation of one form of apparatus which may be used in carrying out the process of the present invention; and FIG. 4 is a schematic representation of an alternative form of apparatus which may be used in carrying out the process of the present invention.

GENERAL DESCRIPTION OF INVENTION

Figure 1:
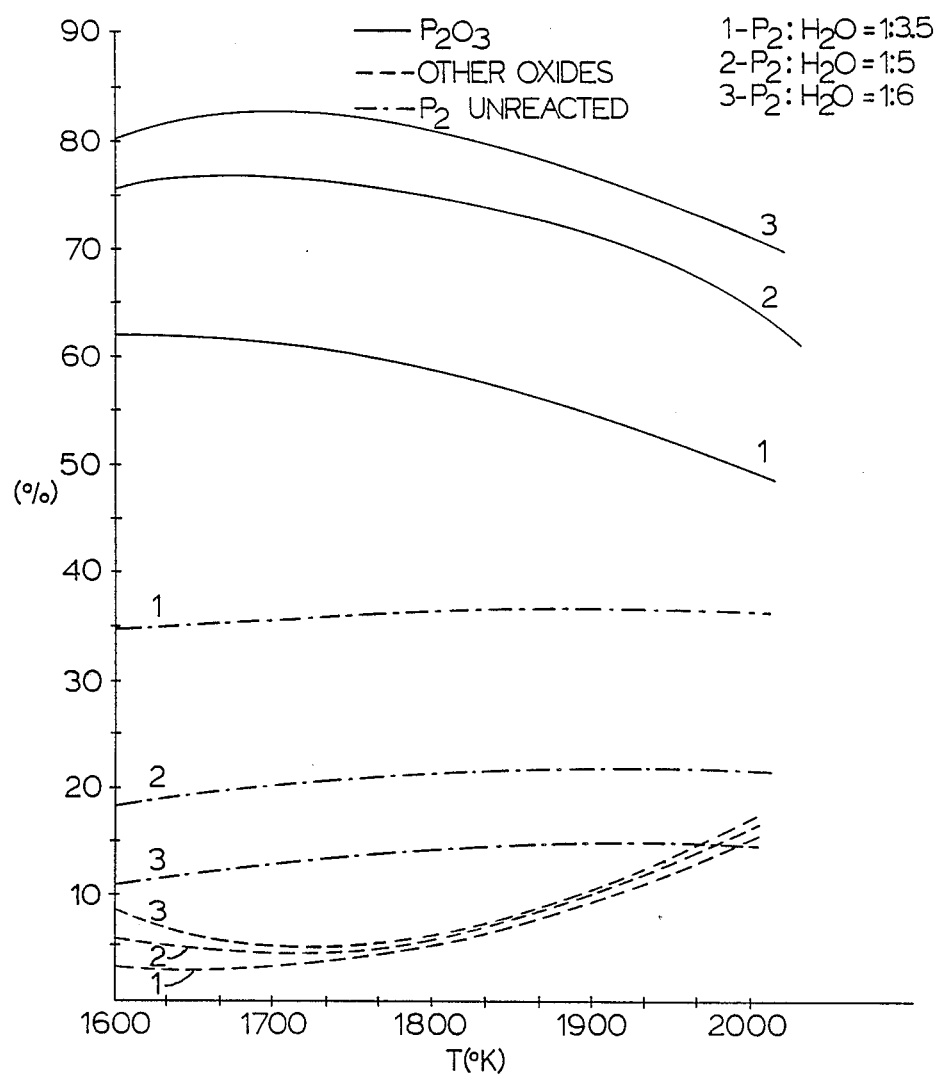
FIG. 1 is a graphical representation of the equilibrium % of phosphorus conversion to $P_2O_3$ and other oxides for several ratios of $P_2$:$H_2O$.

FIGS. 1 and 2 contain graphical representation with respect to conversion of phosphorus to $P_2O_3$. In FIG. 1, there is shown the equilibrium for conversion of phosphorus to $P_2O_3$ for a range of temperatures and for three different $P_2$:$H_2O$ molar ratios. Also shown is the proportion of other phosphorus oxides formed and the proportion of unreacted $P_2$.

FIG. 2 shows the effect of oxygen on the conversion of phosphorus to $P_2O_3$ over the same temperature range, for four mole ratios of oxygen to a fixed mole ratio of 1:3.5 for $P_2$:$H_2O$. The proportion of other phosphorus oxides is shown but the proportions of unreacted phosphorus is not shown. The data presented in FIGS. 1 and 2 was derived from thermodynamic considerations.

The reaction whereby $P_2O_3$ is formed is represented by the equation:

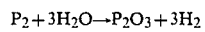

$$P_2 + 3H_2O \rightarrow P_2O_3 + 3H_2$$

The $P_2O_3$ is hydrolyzed when the reaction mixture is rapidly quenched with water, to form $H_3PO_3$ in accordance with the equation:

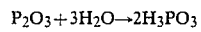

$$P_2O_3 + 3H_2O \rightarrow 2H_3PO_3$$

The $P_2$ species is formed from $P_4$ over a temperature range from about 1000° to about 2500° K. The ratio of $H_2O/P_4$ which is fed to the oxidation reactor can be varied over a wide range without significantly affecting the nature of the product and mainly $P_2O_3$ is formed. The ratio of $H_2O/P_4$, however, affects the extent to which reaction is effected according to the above equation. The yield of $P_2O_3$ which is obtained by the reaction can be increased by increasing the ratio of $H_2O/P_4$. The mole ratio of $H_2O:P_4$ generally ranges from about 2:1 to about 6:1. An amount of unreacted phosphorus remains but yields of $P_2O_3$ up to 85 to 90% be attained. These effects are illustrated graphically in FIG. 1.

The nature of the phosphorus oxide impurities formed in the phosphorus oxidation reaction depend on the temperature of reaction and the phosphorus to oxidant ratio. In general, at temperatures below 1800° K., mainly $P_4O_7$ to $_{10}$ oxides are formed, while above 1800° K., $PO_2$, $PO$ and $P_2O_4$ become the major impurities. If an excess of oxidant is used, the first-mentioned group of oxides tend to form as the impurities.

From a practical standpoint, the ability to form relatively pure $P_2O_3$ over a wide temperature range and over a broad range of reactant ratios is beneficial, since only rough controls need to be exercised on the relative rates of feeding of the two reagents.

Energy input normally is required to realize the stability temperature range of about 1000° to about 2500° K., usually about 1500° to about 2000° K., preferably about 1700° to about 1800° K., enabling a simpler control of reaction temperature than is the case where heat must be removed. However, some oxygen may be fed to the reactor along with the water vapour, so that the exothermic nature of the reaction of phosphorus with oxygen provides part or all of the energy input necessary to attain the stability temperature range, depending on the relative proportions of oxygen and water vapour employed. The use of oxygen in admixture with water vapour also increases the yield of $P_2O_3$ obtained by oxidation of the phosphorus over that obtained with water vapour as the only oxidant. However, the impurity of the $P_2O_3$ which is obtained is adversely affected. These effects are illustrated graphically in FIG. 2.

An amount of unreacted phosphorus is present in the equilibrium mixture at the high temperature of operation and may amount to about 10 to about 35% of the total phosphorus, dependent mainly on the molar ratio of water to $P_4$, as noted above. The temperature of reaction of $P_4$ with $H_2O$ largely coincides with the temperature range whereat $P_2$ is in equilibrium with $P_4$. Thus, at 1000° K., $P_2$ begins to appear and by 2200° K., essentially all the phosphorus is present in the $P_2$ form.

As disclosed in Canadian Pat. No. 849,435 to Albright & Wilson (Mfg) Limited, the species $P_2$ initiates the formation of red amorphous phosphorus (RAP) from $P_4$. When the reaction products are hydrolyzed with water in the present invention, the simultaneous rapid quenching of the unreacted phosphorus may result in retention of the $P_2$ species, which then initiates formation of RAP from the condensed $P_4$. In such event, a significant proportion of the unreacted phosphorus is in the form of RAP, which can be filtered or otherwise separated from the $H_3PO_3$ solution, and recovered for sale. The RAP is obtained in a finely-divided form, which is particularly advantageous for fire retardant applications.

DESCRIPTION OF PREFERRED EMBODIMENTS

Referring to FIG. 3, one form of apparatus 10 for carrying out the process of the invention is illustrated therein. Phosphorus and water vapour are fed respectively by feed lines 12 and 14 into a reaction chamber 16 wherein the phosphorus is oxidized by the water to $P_2O_3$ and hydrogen, typically at a temperature of about 1700° K. Oxygen also may be fed along with the water vapour, if desired, to the reaction chamber 16. The reaction chamber 16 may be a simple holding volume or may include a heating device, such as a plasma torch, when it is desirable to provide some external energy input. Energy input also may be provided by reaction of hydrogen and oxygen, as discussed below with respect to FIG. 4.

The products of reaction formed in the reaction chamber 16 pass to a quenching tower 18 wherein they are contacted with a spray of water or dilute recycled phosphorous acid solution fed to the quenching tower 18 by line 20. The quenching is carried out in such a way as to cool the reaction products in a very rapid manner to a temperature which permits $P_2O_3$ to be dissolved in water to form phosphorous acid. The quenched $P_2O_3$ is dissolved in the quenching medium to form phosphorous acid while any unreacted phosphorus is condensed. Any other phosphorus oxides present also are dissolved in the quenching medium and the respective phosphorus acids formed become contaminants of the product phosphorous acid.

The liquid products of the quenching operation leave the quenching tower 18 by a lower liquid outlet 22 and are collected in a collection tank 24, wherein unreacted phosphorus may separate as a lower layer 26 submerged below a phosphorous acid upper layer 28. The collected unreacted phosphorus may be recycled to the phosphorus feed line 12 while the collected phosphorous acid may be recovered as product or may be recycled to the quench tower spray feed line 20.

Providing the quenching is effected sufficiently rapidly to ensure the survival of $P_2$ species, reaction of the unreacted phosphorus occurs to form RAP, usually mainly in fine particulate form. The RAP may not readily separate as a distinct layer 26, but rather generally is separated by filtration or similar means. The collected RAP may be recovered as a product of the process, rather than being recycled to the phosphorus feed line 12.

The hydrogen produced in the oxidation of the phosphorus in the reaction chamber 16 in this embodiment is vented from the quench tower 18, along with any residual water vapour by gaseous outlet 30.

Turning now to consideration of FIG. 4, there is illustrated therein an alternative form of apparatus 50 wherein the plasma torch used in FIG. 3 is replaced by a hydrogen/oxygen burner 52. Oxygen in line 54 and recycled hydrogen in line 56 are fed to the burner 52 to react together to produce a flame 58 and water vapor for the reaction and possessing the required reaction temperature. A separate water feed 60 may be provided to adjust the steam to the temperature of the steam.

Into the hot steam is injected yellow phosphorus by line 62 to provide a final gaseous reaction mixture temperature within the required range of about 1000° to about 2500° K., to permit the reaction of phosphorus with water to $P_2O_3$ and hydrogen to occur.

The reaction products are rapidly quenched by a spray of water or aqueous $H_3PO_3$ fed by line 64 to the reactor 50, to form $H_3PO_3$. The quenched products leave the reactor 50 by a lower outlet 66 and enter a collection tank 68. The gaseous by-product, hydrogen, is removed from the collection vessel 68 and is recycled to the burner 52 by line 56.

The liquid products of the reaction are shown as an upper phosphorous acid solution layer 70 and a lower unreacted phosphorus layer 72. As noted above in connection with FIG. 3, provided that the quenching of the product gas stream is effected sufficiently rapidly to ensure the survival of the $P_2$ species, reaction of the unreacted phosphorus 72 occurs to form RAP, usually mainly in fine particulate form and may not readily separate as a distinct layer 72. The particulate RAP generally is separated by filtration and may be recovered as a product of the process, or may be recycled to the phosphorus inlet 62.

The phosphorous acid in layer 72 may be recycled by line 74, after removal of particulate RAP to the quench spray inlet 64, so as to concentrate the acid. Water for the quench spray inlet 64 is fed by line 76.

Instead of rapidly cooling the $P_2O_3$ by contact with water, as described above with respect to FIGS. 3 and 4, thereby to form phosphorous acid, it is possible to recover the $P_2O_3$ as the product of the reaction by rapidly cooling the $P_2O_3$ to an ambient temperature with a suitable inert cooling medium, such as nitrogen.

SUMMARY OF DISCLOSURE

In summary of this disclosure, the present invention provides a novel process for forming phosphorous acid by oxidizing elemental phosphorus with water vapour and dissolving the relatively high purity $P_2O_3$ so formed in water, or, alternatively, the $P_2O_3$ may be recovered as the product of the reaction. Modifications are possible within the scope of this invention.

What we claim is:

1. A process for forming phosphorous acid, which comprises oxidizing phosphorus in the gaseous phase with water vapour predominately to $P_2O_3$ at a temperature of about 1000° to about 2500° K., and dissolving the $_2O_3$ so-formed in an agueous medium.

2. The process of claim 1 wherein said reaction temperature is about 1500° to about 2000° K.

3. The process of claim 2 wherein said reaction temperature is about 1700° to about 1800° K.

4. The process of claim 1 wherein gaseous oxygen also is employed in said oxidation of phosphorus predominantly to $P_2O_3$.

5. The process of claim 4 wherein the ratio of oxygen to water vapour employed in said oxidation reaction is up to that at which the oxidation reaction does not require external energy input to maintain the reaction temperature.

6. The process of claim 1 wherein the ratio of $P_4:H_2O$ used in said oxidation is about 1:2 to about 1:6.

7. The process of claim 6 which is effected by separately feeding vaporized phosphorus and water vapour to a reaction zone having the required temperature of reaction and thereafter rapidly quenching the gaseous reaction products with an aqueous quenching medium.

8. The process of claim 7 wherein said aqueous quenching medium is water or dilute phosphorous acid.

9. The process of claim 7 wherein said quenching is effected sufficiently rapidly to result in the formation of red amorphous phosphorus (RAP) from unreacted phosphorus, and said RAP is collected as product.

10. The process of claim 1 wherein heat to maintain said reaction temperature is provided by a plasma torch.

11. The process of claim 1 wherein heat to maintain said reaction temperature is provided by a burning hydrogen and oxygen and said burning also produces at least part of said water vapor for said gaseous phase oxidation.

12. The process of claim 11 wherein at least part of said hydrogen used in said burning is recycled by-product hydrogen gas from said gaseous phase oxidation.

13. A process for forming phosphorus trioxide, which comprises oxidizing phosphorus in the gaseous phase with water vapor predominantly to $P_2O_3$ at a temperature of about 1000° to about 2500° K., and rapidly cooling said $P_2O_3$ to a temperature at which said $P_2O_3$ may be recovered as a stable phase.

14. The process of claim 13 wherein said reaction temperature is about 1500° to about 2000° K.

15. The process of claim 14 wherein said reaction temperature is about 1700° to about 1800° K.

16. The process of claim 13 wherein the ratio of $P_4:H_2O$ used in said oxidation is about 1:2 to about 1:6.

17. The process of claim 16 which is effected by separately feeding vaporized phosphorus and water vapour to a reaction zone having the required temperature of reaction and thereafter rapidly quenching the gaseous reaction products with an inert quenching medium.

18. The process of claim 13 wherein heat to maintain said reaction temperature is provided by a plasma torch.

19. The process of claim 17 wherein said quenching is effected sufficiently rapidly to reserve in the formation of red amorphous phosphorus (RAP) from unreacted phosphorus, and said RAP is collected as product.

20. The process of claim 13 wherein said $P_2O_3$ is rapidly cooled with an inert quench medium to a temperature below about 350° K. to recover said $P_2O_3$ as $P_4O_6$.

* * * * *